US012657382B2

(12) United States Patent
Lee

(10) Patent No.: US 12,657,382 B2
(45) Date of Patent: Jun. 16, 2026

(54) METHOD AND SYSTEM FOR SHARING VEHICLE LOCATION THROUGH MOBILE TEXT MESSAGE PARSING

(71) Applicants: Hyundai Motor Company, Seoul (KR); Kia Corporation, Seoul (KR)

(72) Inventor: Min Woo Lee, Whasung-Si (KR)

(73) Assignees: Hyundai Motor Company;, Seoul (KR); Kia Corporation, Seoul (KR)

( * ) Notice: Subject to any disclaimer, the term of this patent is extended or adjusted under 35 U.S.C. 154(b) by 0 days.

(21) Appl. No.: 18/656,258

(22) Filed: May 6, 2024

(65) Prior Publication Data

US 2025/0181827 A1 Jun. 5, 2025

(30) Foreign Application Priority Data

Dec. 5, 2023 (KR) ........................ 10-2023-0174659

(51) Int. Cl.
| | |
|---|---|
| *G06F 40/205* | (2020.01) |
| *H04L 51/07* | (2022.01) |
| *H04W 4/029* | (2018.01) |
| *G06F 3/0481* | (2022.01) |
| *G06F 3/04842* | (2022.01) |

(52) U.S. Cl.
CPC ........... *G06F 40/205* (2020.01); *H04L 51/07* (2022.05); *H04W 4/029* (2018.02); *G06F 3/0481* (2013.01); *G06F 3/04842* (2013.01)

(58) Field of Classification Search
None
See application file for complete search history.

(56) References Cited

U.S. PATENT DOCUMENTS

| | | | | |
|---|---|---|---|---|
| 2004/0054428 | A1* | 3/2004 | Sheha | G06F 3/0484 700/56 |
| 2004/0158401 | A1* | 8/2004 | Yoon | G01C 21/3438 701/410 |
| 2007/0078595 | A1* | 4/2007 | Song | G08G 1/20 701/410 |
| 2013/0274960 | A1* | 10/2013 | Zilka | H04M 1/72436 701/2 |
| 2020/0076800 | A1* | 3/2020 | Chun | H04L 63/0876 |
| 2024/0223998 | A1* | 7/2024 | You | H04W 4/029 |

* cited by examiner

*Primary Examiner* — June Sison
(74) *Attorney, Agent, or Firm* — MORGAN, LEWIS & BOCKIUS LLP

(57) ABSTRACT

In a method and system for sharing a vehicle location through mobile text message parsing, the method of sharing a vehicle location through mobile text message parsing includes extracting a text message and a mobile phone number of a user from a mobile device of the user, receiving shared data for real-time location sharing with a vehicle of another user from a server based on a parsing result for the text message and the mobile phone number of the user, and providing a real-time location sharing service with respect to the vehicle of the other user according to input by the user for a sharing selection message for selecting whether to share a real-time location with the vehicle of the other user displayed in response to the shared data.

15 Claims, 6 Drawing Sheets

METHOD AND SYSTEM FOR SHARING VEHICLE LOCATION THROUGH MOBILE TEXT MESSAGE PARSING

CROSS-REFERENCE TO RELATED APPLICATION

The present application claims priority to Korean Patent Application No. 10-2023-0174659, filed on Dec. 5, 2023, the entire contents of which is incorporated herein for all purposes by this reference.

BACKGROUND OF THE PRESENT DISCLOSURE

Field of the Present Disclosure

The present disclosure relates to a method and system for sharing a vehicle location through mobile text message parsing.

Description of Related Art

A conventional vehicle location sharing service is a service that allows vehicles to mutually share locations thereof. Specifically, to share locations between vehicles, terminal numbers of the vehicles (for example, 012-XXXX-XXXX), each of which is in a number format different from that of a mobile phone number, need to be known. In the present way, the vehicle location sharing service may be used.

However, most users do not know terminal numbers of other vehicles, and it is difficult for a user to even know a terminal number of a vehicle driven by the user, which causes great inconvenience in using the vehicle location sharing service.

Furthermore, even when a vehicle sends a location sharing request through a mobile phone number, a location of a vehicle may only be shared on a mobile phone, and to share the location between vehicles, it is essential to know a terminal number of the vehicle.

The information included in this Background of the present disclosure is only for enhancement of understanding of the general background of the present disclosure and may not be taken as an acknowledgement or any form of suggestion that this information forms the prior art already known to a person skilled in the art.

BRIEF SUMMARY

Various aspects of the present disclosure are directed to providing a real-time location sharing service between vehicles using a text message sent to a mobile device of a user through a mobile phone number of a user.

In accordance with an aspect of the present disclosure, the above and other objects may be accomplished by the provision of a method of sharing a vehicle location through mobile text message parsing, the method including extracting a text message and a mobile phone number of a user from a mobile device of the user, receiving shared data for real-time location sharing with a vehicle of another user from a server based on a parsing result for the text message and the mobile phone number of the user, and providing a real-time location sharing service with respect to the vehicle of the other user through a vehicle display based on the shared data.

The receiving may include parsing the text message to extract a sharing proposal message including text corresponding to preset identification text in the text message, transmitting, to the server, a specific uniform resource identifier (URI) parsed from the sharing proposal message and the mobile phone number of the user, and receiving, from the server, the shared data for the vehicle of the other user corresponding to the specific URI and the mobile phone number of the user.

The providing may include displaying a sharing selection message for selecting whether to share a real-time location with the vehicle of the other user in response to the shared data, receiving input by the user for the displayed sharing selection message, and providing a service in which a vehicle of the user mutually shares real-time locations with the vehicle of the other user, exclusively providing a real-time location sharing service of the vehicle of the other user, or not providing the real-time location sharing service with respect to the vehicle of the other user according to input by the user.

The sharing selection message may include a first selection button allowing a vehicle of the user and the vehicle of the other user to mutually accept real-time location sharing, a second selection button exclusively allowing acceptance of real-time location sharing of the vehicle of the other user, and a third selection button for rejecting real-time location sharing with the vehicle of the other user.

The preset identification text may be set to a part of text included in the specific URI, and the specific URI may link to a Webpage that provides a real-time location of the vehicle of the other user.

In accordance with another aspect of the present disclosure, there is provided an apparatus for sharing a vehicle location through mobile text message parsing, the apparatus including a memory configured to store instructions for vehicle location sharing, and a processor operatively connected to the memory and configured to execute the instructions, wherein, when the instructions are executed by the processor, the processor is configured to extract a text message and a mobile phone number of a user from a mobile device of the user, receive shared data for real-time location sharing with a vehicle of another user from a server based on a parsing result for the text message and the mobile phone number of the user, and provide a real-time location sharing service with respect to the vehicle of the other user through a vehicle display based on the shared data.

The processor may be further configured to parse the text message to extract a sharing proposal message including text corresponding to preset identification text in the text message, transmit, to the server, a specific URI parsed from the sharing proposal message and the mobile phone number of the user, and receive, from the server, the shared data for the vehicle of the other user corresponding to the specific URI and the mobile phone number of the user.

The processor may be further configured to display a sharing selection message for selecting whether to share a real-time location with the vehicle of the other user in response to the shared data, receive input by the user for the displayed sharing selection message, and provide a service in which a vehicle of the user mutually shares real-time locations with the vehicle of the other user, exclusively provide a real-time location sharing service of the vehicle of the other user, or not provide the real-time location sharing service with respect to the vehicle of the other user according to input by the user.

The sharing selection message may include a first selection button allowing a vehicle of the user and the vehicle of the other user to mutually accept real-time location sharing, a second selection button exclusively allowing acceptance of real-time location sharing of the vehicle of the other user, and a third selection button for rejecting real-time location sharing with the vehicle of the other user.

The preset identification text may be set to a part of text included in the specific URI, and the specific URI may link to a Webpage that provides a real-time location of the vehicle of the other user.

In accordance with a further aspect of the present disclosure, there is provided a method of sharing a vehicle location through mobile text message transmission, the method including receiving, from a vehicle of a first user, a sharing request message for real-time location sharing with a vehicle of a second user and a mobile phone number of the second user, transmitting, to a mobile device of the second user, a sharing proposal message for proposing real-time location sharing with the vehicle of the first user generated using the sharing request message and the mobile phone number of the second user, and transmitting first shared data for real-time location sharing with the vehicle of the first user to the vehicle of the second user in response to specific text and the mobile phone number of the second user included in the sharing proposal message received from the vehicle of the second user, wherein the vehicle of the second user obtains the sharing proposal message and the mobile phone number of the second user from the mobile device of the second user.

The method may further include receiving input by the second user input for a sharing selection message for selecting whether to share a real-time location with the vehicle of the first user displayed in response to the first shared data in the vehicle of the second user, and transmitting second shared data for real-time location sharing with the vehicle of the second user to the vehicle of the first user according to input by the second user.

The sharing selection message may include a first selection button allowing the vehicle of the second user to mutually accept real-time location sharing with the vehicle of the first user, a second selection button allowing the vehicle of the second user to exclusively receive real-time location sharing of the vehicle of the first user, and a third selection button allowing the vehicle of the second user to reject real-time location sharing with the vehicle of the first user, and the transmitting second shared data may include transmitting the second shared data upon receiving input by the second user for the first selection button.

The sharing request message may include at least one of location information of the vehicle of the first user, memo text for the second user input by the first user, and a destination of the first user, and the sharing proposal message may include at least one of a specific URI that links to a Webpage providing a real-time location of the vehicle of the first user, the memo text, and the destination of the first user.

The specific text may be the specific URI extracted by parsing the sharing proposal message from the vehicle of the second user.

In accordance with a further aspect of the present disclosure, there is provided a server for sharing a vehicle location through mobile text message transmission, the server including a memory configured to store instructions for vehicle location sharing, and a processor operatively connected to the memory and configured to execute the instructions, wherein, when the instructions are executed by the processor, the processor is configured to receive, from a vehicle of a first user, a sharing request message for real-time location sharing with a vehicle of a second user and a mobile phone number of the second user, transmit, to a mobile device of the second user, a sharing proposal message for proposing real-time location sharing with the vehicle of the first user generated using the sharing request message and the mobile phone number of the second user, transmit first shared data for real-time location sharing with the vehicle of the first user to the vehicle of the second user in response to specific text and the mobile phone number of the second user included in the sharing proposal message received from the vehicle of the second user, and obtain the sharing proposal message and the mobile phone number of the second user from the mobile device of the second user.

The processor may be further configured to receive input by the second user input for a sharing selection message for selecting whether to share a real-time location with the vehicle of the first user displayed in response to the first shared data in the vehicle of the second user, and transmit second shared data for real-time location sharing with the vehicle of the second user to the vehicle of the first user according to input by the second user.

The sharing selection message may include a first selection button allowing the vehicle of the second user to mutually accept real-time location sharing with the vehicle of the first user, a second selection button allowing the vehicle of the second user to exclusively receive real-time location sharing of the vehicle of the first user, and a third selection button allowing the vehicle of the second user to reject real-time location sharing with the vehicle of the first user, and the processor is configured to transmit the second shared data upon receiving input by the second user for the first selection button.

The sharing request message may include at least one of location information of the vehicle of the first user, memo text for the second user input by the first user, and a destination of the first user, and the sharing proposal message may include at least one of a specific URI that links to a Webpage providing a real-time location of the vehicle of the first user, the memo text, and the destination of the first user.

The specific text may be the specific URI extracted by parsing the sharing proposal message from the vehicle of the second user.

The methods and apparatuses of the present disclosure have other features and advantages which will be apparent from or are set forth in more detail in the accompanying drawings, which are incorporated herein, and the following Detailed Description, which together serve to explain certain principles of the present disclosure.

Figure 1:
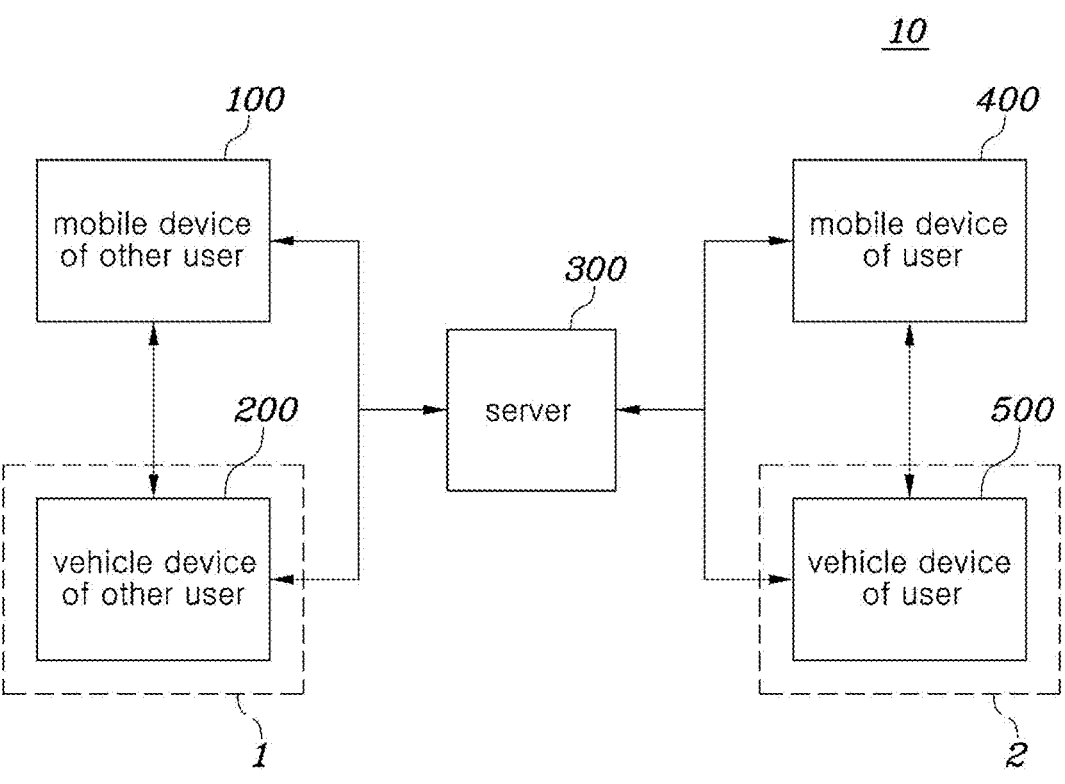
FIG. 1 is a diagram illustrating a vehicle location sharing system according to an exemplary embodiment of the present disclosure.

It may be understood that the appended drawings are not necessarily to scale, presenting a somewhat simplified representation of various features illustrative of the basic principles of the present disclosure. The specific design features of the present disclosure as included herein, including, for example, specific dimensions, orientations, locations, and shapes will be determined in part by the particularly intended application and use environment.

In the figures, reference numbers refer to the same or equivalent portions of the present disclosure throughout the several figures of the drawing.

DETAILED DESCRIPTION

Reference will now be made in detail to various embodiments of the present disclosure(s), examples of which are illustrated in the accompanying drawings and described below. While the present disclosure(s) will be described in conjunction with exemplary embodiments of the present disclosure, it will be understood that the present description is not intended to limit the present disclosure(s) to those exemplary embodiments of the present disclosure. On the other hand, the present disclosure(s) is/are intended to cover not only the exemplary embodiments of the present disclosure, but also various alternatives, modifications, equivalents and other embodiments, which may be included within the spirit and scope of the present disclosure as defined by the appended claims.

Hereinafter, various exemplary embodiments included in the present specification will be described in detail with reference to the appended drawings. However, identical or similar components will be assigned the same reference numbers regardless of reference symbols, and duplicate descriptions thereof will be omitted. The suffixes "module" and "unit" for components used in the following description are provided or used interchangeably only for the ease of preparing the specification, and do not have distinct meanings or roles in themselves. Furthermore, in describing embodiments included in the present specification, when it is determined that a detailed description of related publicly known technology may obscure the gist of the exemplary embodiments included in the present specification, the detailed description thereof will be omitted. Furthermore, the appended drawings are only for easy understanding of the exemplary embodiments included in the present specification, and the technical idea included in the present specification is not limited by the appended drawings. Furthermore, it should be understood that the present disclosure encompasses all changes, equivalents, and substitutes included in the spirit and technical scope of the present disclosure.

Although terms including ordinal numbers, such as "first", "second", etc., may be used herein to describe various components, the components are not limited by these terms. These terms are generally only used to distinguish one component from another.

When a component is referred to as being "coupled" or "connected" to another component, the component may be directly coupled or connected to the other component. However, it should be understood that another component may be present therebetween. In contrast, when a component is referred to as being "directly coupled" or "directly connected" to another component, it should be understood that there are no other components therebetween.

A singular expression includes the plural form unless the context clearly dictates otherwise.

In the present specification, it should be understood that a term such as "include" or "have" is intended to designate that the features, numbers, steps, operations, components, parts, or combinations thereof described in the specification are present, and does not preclude the possibility of presence or addition of one or more other features, numbers, steps, operations, components, parts, or combinations thereof.

FIG. 1 is a diagram illustrating a vehicle location sharing system according to an exemplary embodiment of the present disclosure.

A vehicle location sharing system 10 includes a mobile device 100 of another user, a vehicle device 200 of the other user, a server 300, a mobile device 400 of a user, and a vehicle device 500 of the user.

The vehicle location sharing system 10 easily provides a real-time location sharing service between a vehicle 1 of the other user and a vehicle 2 of the user using a text message sent to the mobile device 400 of the user through a mobile phone number of the user.

The vehicle location sharing system 10 provides a service that allows real-time location sharing between vehicles through the mobile phone number of the user desiring location sharing even when a terminal number of the vehicle is not known, being able to provide users with convenience for the vehicle location sharing service and further activate the vehicle location sharing service.

The vehicle location sharing system 10 includes a URI allowing a location of a vehicle proposing sharing to be checked in real time in a text message proposing vehicle location sharing, and parses the URI to identify the text message as a sharing proposal message, easily detecting real-time locations of other vehicles using only mobile devices of users. At the same time, the vehicle location sharing system 10 may easily distinguish between a general text message and a sharing request message received on a mobile device, and does not add additional text to identify the sharing request message, being able to efficiently provide the location sharing service between vehicles.

The mobile device 100 of the other user may receive a sharing proposal message for real-time location sharing with the vehicle 2 of the user. Hereinafter, when receiving a sharing proposal message, an operation of the mobile device 100 of the other user is the same as an operation of the mobile device 400 of the user, which will be described later, and thus a description thereof will be omitted.

Furthermore, a subject requesting location sharing or a subject accepting location sharing may be changed between the mobile device 100 of the other user and the vehicle device 200 of the other user and the mobile device 400 of the user and the vehicle device 500 of the user depending on the situation. Accordingly, even though the same operation is performed, for convenience of description, the subject requesting location sharing will be referred to as the other user, the mobile device 100 of the other user, the vehicle device 200 of the other user, and the vehicle 1 of the other user, and the subject accepting location sharing will be referred to as the user, the mobile device 400 of the user, the vehicle device 500 of the user, and the vehicle 2 of the user.

The vehicle device 200 of the other user may be provided in the vehicle 1 of the other user to provide a real-time location sharing service with respect to the vehicle 2 of the user.

The vehicle device 200 of the other user may transmit a sharing request message and the mobile phone number of the user for real-time location sharing with the vehicle 2 of the user to the server 300.

For example, when the vehicle device 200 of the other user transmits the sharing request message, location information of the vehicle 1 of the other user may be transmitted to the server 300 in real time.

For example, the sharing request message may include at least one of location information of the vehicle of the other user, memo text for the user input by the other user, and a destination of the other user.

The server 300 may use the sharing request message received from the vehicle device 200 of the other user and the mobile phone number of the user to transmit, to the mobile device 400 of the user, a sharing proposal message proposing real-time location sharing between the vehicle 2 of the user and the vehicle 1 of the other user.

The server 300 may transmit shared data for real-time location sharing with the vehicle 1 of the other user to the vehicle 2 of the user in response to specific text and the mobile phone number of the user included in the sharing proposal message received from the vehicle 2 of the user.

For example, the shared data may include at least one of the location information of the vehicle 1 of the other user, the memo text for the user input by the other user, and the destination of the other user.

The mobile device 400 of the user may receive a text message (for example, a short message service (SMS) message or a social network service (SNS) message).

For example, the text message may include a general message and the sharing proposal message received from the server 300. The general message may mean any message other than the sharing proposal message.

The mobile device 400 of the user may be connected to the vehicle device 500 of the user wirelessly and/or by wire to transmit and receive data. For example, the mobile device 400 of the user may be connected to the vehicle device 500 of the user via Bluetooth to transmit and receive data.

The mobile device 400 of the user may transmit a text message and the mobile phone number of the user in response to an extraction request transmitted by the vehicle device 500 of the user.

The mobile device 400 of the user may display a real-time location of the vehicle 1 of the other user according to touch input by the user for the URI included in the sharing proposal message.

The vehicle device 500 of the user may be provided in the vehicle 2 of the user to provide a real-time location sharing service with respect to the vehicle 1 of the other user.

The vehicle device 500 of the user may extract the text message and the mobile phone number of the user from the mobile device 400 of the user.

The vehicle device 500 of the user may extract shared data for real-time location sharing with the vehicle 1 of the other user from the server 300 based on a parsing result for the text message and the mobile phone number of the user.

The vehicle device 500 of the user may provide the real-time location sharing service with respect to the vehicle 1 of the other user based on the shared data through a vehicle display.

The vehicle device 500 of the user may include the vehicle display to display the sharing selection message, the real-time location sharing service with respect to the vehicle 1 of the other user, etc.

When location sharing is provided from the vehicle device 200 of the other user to the mobile device 400 of the user through the vehicle location sharing system having the above configuration, and the user boards the vehicle 2 with the mobile device 400, checking location sharing on a mobile screen may be inconvenient. Therefore, the vehicle device 500 is connected to the mobile device 400 of the user to search for a message related to location sharing, and when the related message is present, the vehicle device 500 receives location sharing information to share the location through a vehicle screen, which is convenient. Furthermore, even when location sharing is performed between the vehicle 1 and the vehicle 2, other users may not know the terminal number of the vehicle 2, and thus location sharing between vehicles may start through the mobile device 400 of the user. However, this is illustrative, and the exemplary embodiment of the present disclosure is not limited to the start of sharing.

Figure 2:
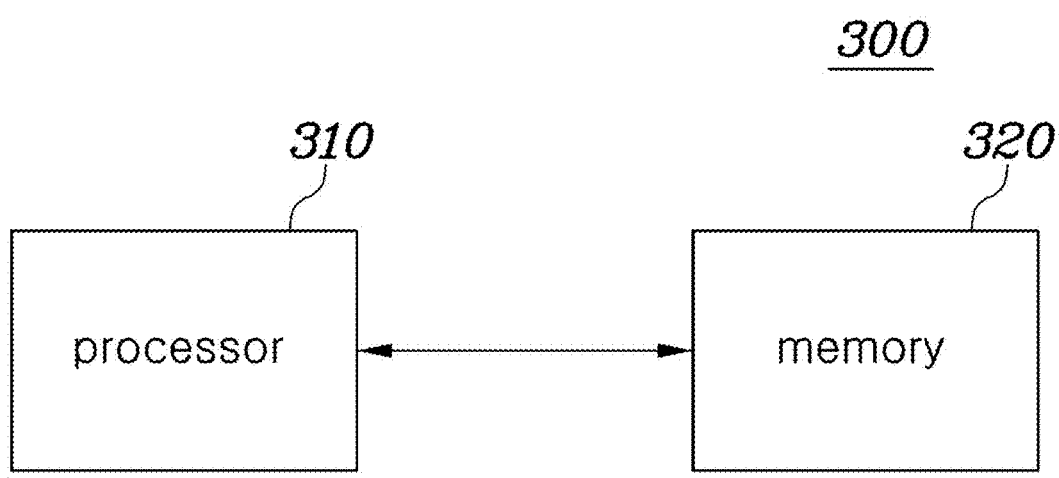
FIG. 2 is a diagram schematically illustrating a server illustrated in FIG. 1.

FIG. 2 is a diagram schematically illustrating the server illustrated in FIG. 1.

The server 300 includes a processor 310 and a memory 320. The server 300 is connected to a network through the processor 310 and may communicate with the mobile device 100 of the other user, the vehicle device 200 of the other user, the mobile device 400 of the user, the vehicle device 500 of the user.

The processor 310 may include at least one of a central processing unit, an application processor, or a communication processor.

The processor 310 may perform operations or data processing related to the control of at least one other component of the server 300. For example, the processor 310 may execute applications and/or software stored in the memory 320.

The processor 310 may be configured for processing received data and data stored in the memory 320. The processor 310 may be configured for processing data stored in the memory 320. The processor 310 may execute computer-readable code (for example, software) stored in the memory 320 and instructions triggered by the processor 310.

The processor 310 may be a data processing device implemented as hardware including circuitry suitable for executing desired operations. For example, the desired operations may include code or instructions included in a program.

For example, the data processing device implemented as hardware may include a microprocessor, a central processing unit, a processor core, a multi-core processor, a multi-processor, an Application-specific integrated circuit (ASIC), and a Field Programmable Gate Array (FPGA).

For convenience of description, the operation of the vehicle device 200 of the other user described with reference to FIG. 1 may be expressed as an operation of the vehicle 1 of the other user including the same, and the operation of the vehicle device 500 of the user may be expressed as an operation of the vehicle 2 of the user including the same.

The processor 310 may receive a sharing request message for real-time location sharing with the vehicle 2 of the user and the mobile phone number of the user from the vehicle 1 of the other user.

For example, the sharing request message may include at least one of the location information of the vehicle 1 of the other user, the memo text for the user input by the other user, and the destination of the other user.

The processor 310 may transmit a sharing proposal message suggesting real-time location sharing with the vehicle 1 of the other user to the mobile device 400 of the user using the sharing request message and the mobile phone number of the user.

For example, the sharing proposal message may include at least one of a specific URI that links to a Webpage providing a real-time location of the vehicle 1 of the other user, memo text, and the destination of the other user.

For example, the specific URI may include verification text for verification and/or operational text for operation.

The processor 310 may be configured to generate shared data including at least one of the location information of the vehicle 1 of the other user, the memo text for the user input by the other user, and the destination of the other user.

The processor 310 may store the shared data to correspond to the specific URI and the mobile phone number of the user.

For example, the vehicle 2 of the user may obtain the sharing proposal message and the mobile phone number of the user from the mobile device 400 of the user.

The processor 310 may transmit first shared data for real-time location sharing with the vehicle 1 of the other user to the vehicle 2 of the user in response to specific text and the mobile phone number of the user included in the sharing proposal message received from the vehicle 2 of the user.

For example, the specific text may be a specific URI extracted by parsing the sharing proposal message from the vehicle 2 of the user.

For example, the shared data may include at least one of the location information of the vehicle 1 of the other user, the memo text for the user input by the other user, and the destination of the other user.

The processor 310 may receive user input for the sharing selection message for selecting whether to share real-time locations with the vehicle 1 of the other user displayed in response to the shared data from the vehicle 2 of the user.

For example, the sharing selection message may include a first selection button allowing the vehicle 2 of the user to mutually accept real-time location sharing with the vehicle of the other user, a second selection button allowing the vehicle of the user to receive only real-time location sharing of the vehicle 1 of the other user, and a third selection button allowing the vehicle of the user to reject real-time location sharing with the vehicle of the other user.

The processor 310 may transmit second shared data for real-time location sharing with the vehicle 2 of the user to the vehicle 1 of the other user according to user input.

For example, the processor 310 may transmit the second shared data in response to receiving user input for the first selection button.

The memory 320 may include a volatile and/or nonvolatile memory. The memory 320 may store a command and/or data related to at least one other component of the server 300.

The memory 320 may store software and/or a program. For example, the memory 320 may store an application, software, etc. for vehicle location sharing.

Figure 3:
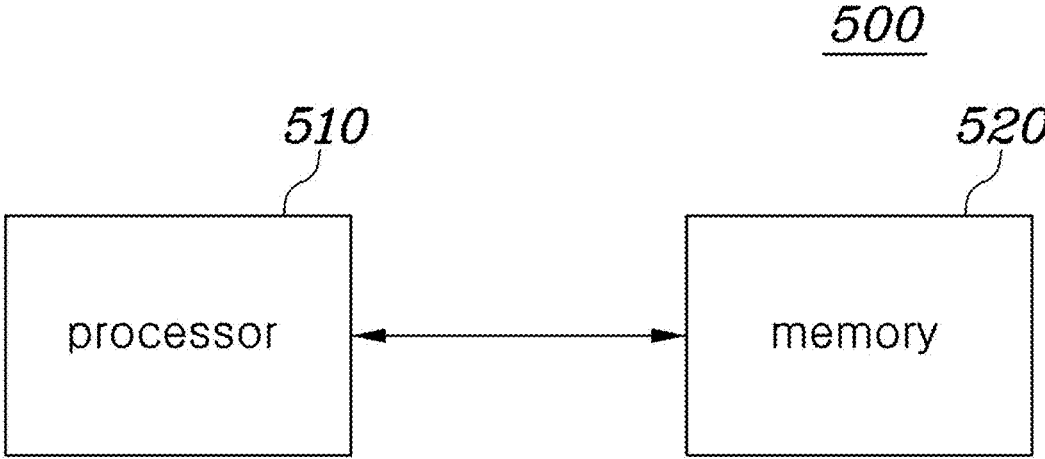
FIG. 3 is a diagram schematically illustrating a vehicle device of a user illustrated in FIG. 1.

FIG. 3 schematically illustrates the vehicle device of the user illustrated in FIG. 1.

The vehicle device 500 of the user includes a processor 510 and a memory 520. The vehicle device 500 of the user is connected to wired and wireless communication and/or a network through the processor 510 and may communicate with the server 300, the mobile device 400 of the user, etc.

The processor 510 may include at least one of a central processing unit, an application processor, or a communication processor.

The processor 510 may perform operations or data processing related to the control of at least one other component of the vehicle device 500 of the user. For example, the processor 510 may execute applications and/or software stored in the memory 520.

The processor 510 may be configured for processing received data and data stored in the memory 520. The processor 510 may be configured for processing data stored in the memory 520. The processor 510 may execute computer-readable code (for example, software) stored in the memory 520 and instructions triggered by the processor 510.

The processor 510 may be a data processing device implemented as hardware including circuitry suitable for executing desired operations. For example, the desired operations may include code or instructions included in a program.

For example, the data processing device implemented as hardware may include a microprocessor, a central processing unit, a processor core, a multi-core processor, a multiprocessor, an ASIC, and an FPGA.

For convenience of description, the operation of the vehicle device 200 of the other user described with reference to FIG. 1 may be expressed as an operation of the vehicle 1 of the other user including the same, and the operation of the vehicle device 500 of the user may be expressed as an operation of the vehicle 2 of the user including the same.

The processor 510 may extract a text message and the mobile phone number of the user from the mobile device 400 of the user.

The processor 510 may receive shared data for real-time location sharing with the vehicle 1 of the other user from the server based on a parsing result for the text message and the mobile phone number of the user.

For example, the processor 510 may parse the text message and extract a sharing proposal message including text corresponding to preset identification text from the text message.

The processor 510 may transmit, to the server 300, a specific URI and the mobile phone number of the user parsed from the sharing proposal message.

For example, the preset identification text may be set as a part of text included in the specific URI.

For example, the specific URI may link to a Webpage that provides a real-time location of the vehicle 1 of the other user.

The processor 510 may receive shared data for the vehicle of the other user corresponding to the specific URI and the mobile phone number of the user from the server 300.

The processor 510 may provide a real-time location sharing service with respect to the vehicle 1 of the other user through the vehicle display based on the shared data.

The processor 510 may display a sharing selection message for selecting whether to share real-time locations with the vehicle of the other user in response to the shared data.

For example, the sharing selection message may include a first selection button allowing the vehicle 2 of the user and the vehicle 1 of the other user to mutually accept real-time location sharing, a second selection button allowing acceptance of only real-time location sharing of the vehicle 1 of the other user, and a third selection button for rejecting real-time location sharing with the vehicle 1 of the other user.

The processor 510 may receive user input for the displayed sharing selection message.

According to user input, the processor 510 may provide a service in which the vehicle 2 of the user and the vehicle 1 of the other user mutually share real-time locations, provide only a real-time location sharing service of the vehicle 1 of the other user, or not provide a real-time location sharing service with respect to the vehicle 1 of the other user.

The memory 520 may include a volatile and/or nonvolatile memory. The memory 520 may store a command and/or data related to at least one other component of the vehicle device 500 of the user.

The memory 520 may store software and/or a program. For example, the memory 520 may store an application, software, etc. for vehicle location sharing.

Figure 4:
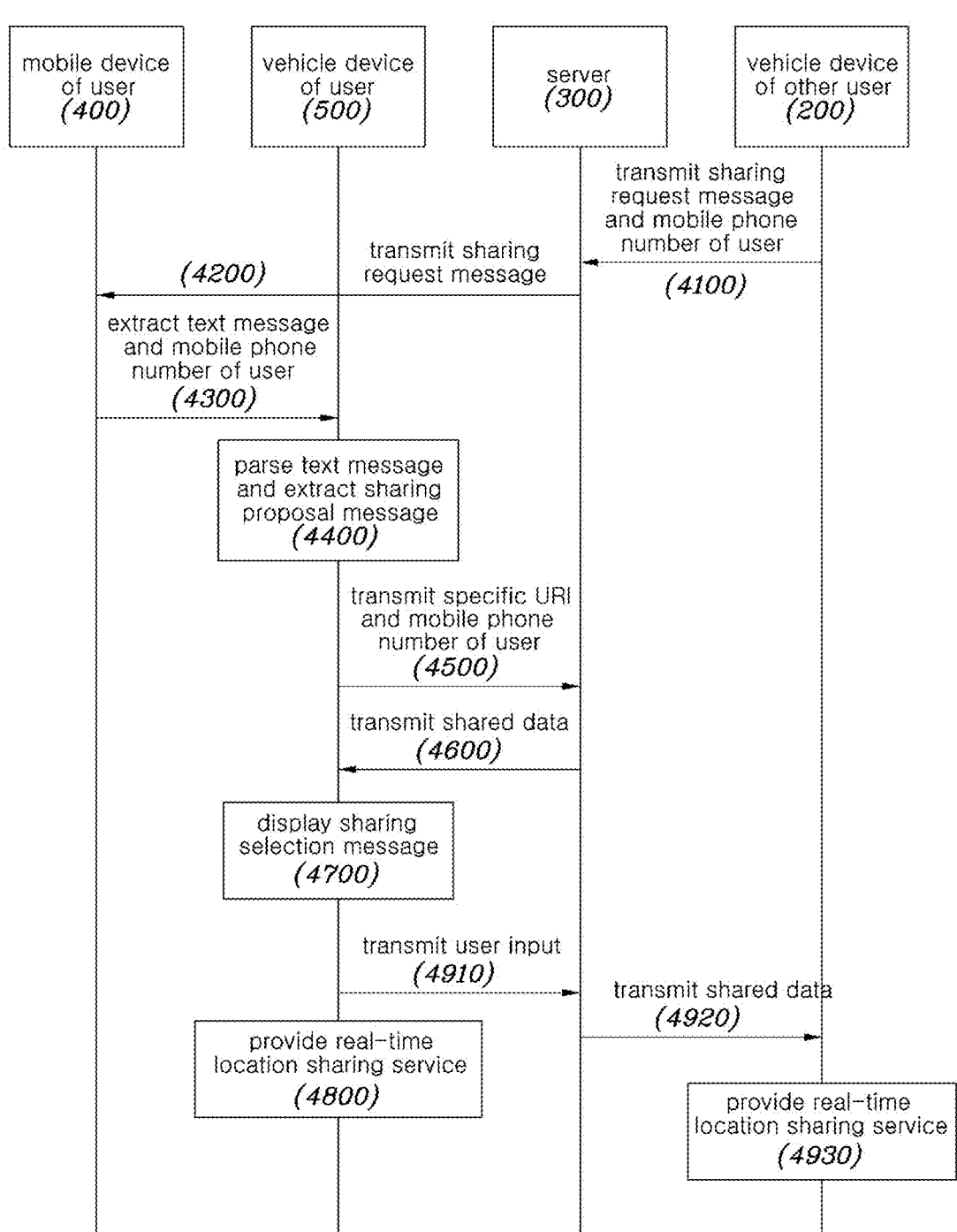
FIG. 4 is a diagram illustrating a vehicle location sharing method according to an exemplary embodiment of the present disclosure.
Figure 5:
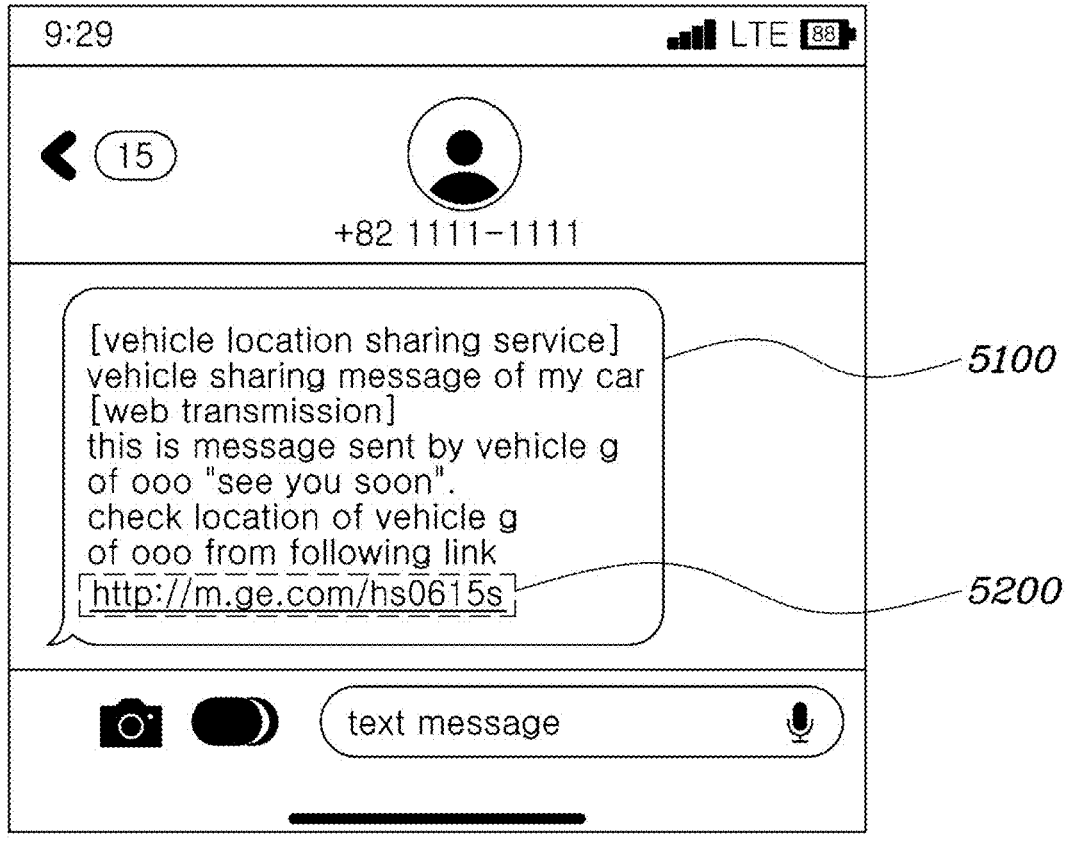
FIG. 5 is a diagram illustrating an example of a sharing proposal message provided by the server.
Figure 6:
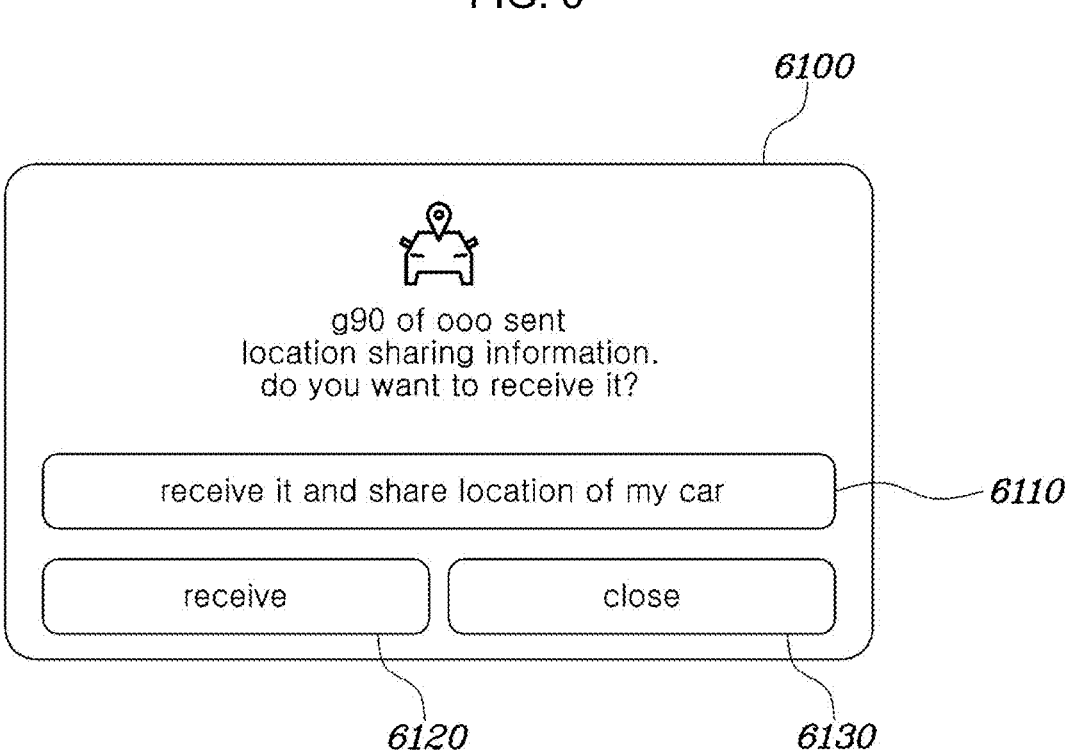
FIG. 6 is a diagram illustrating an example of a sharing selection message displayed by the vehicle device of the user.
Figure 7:
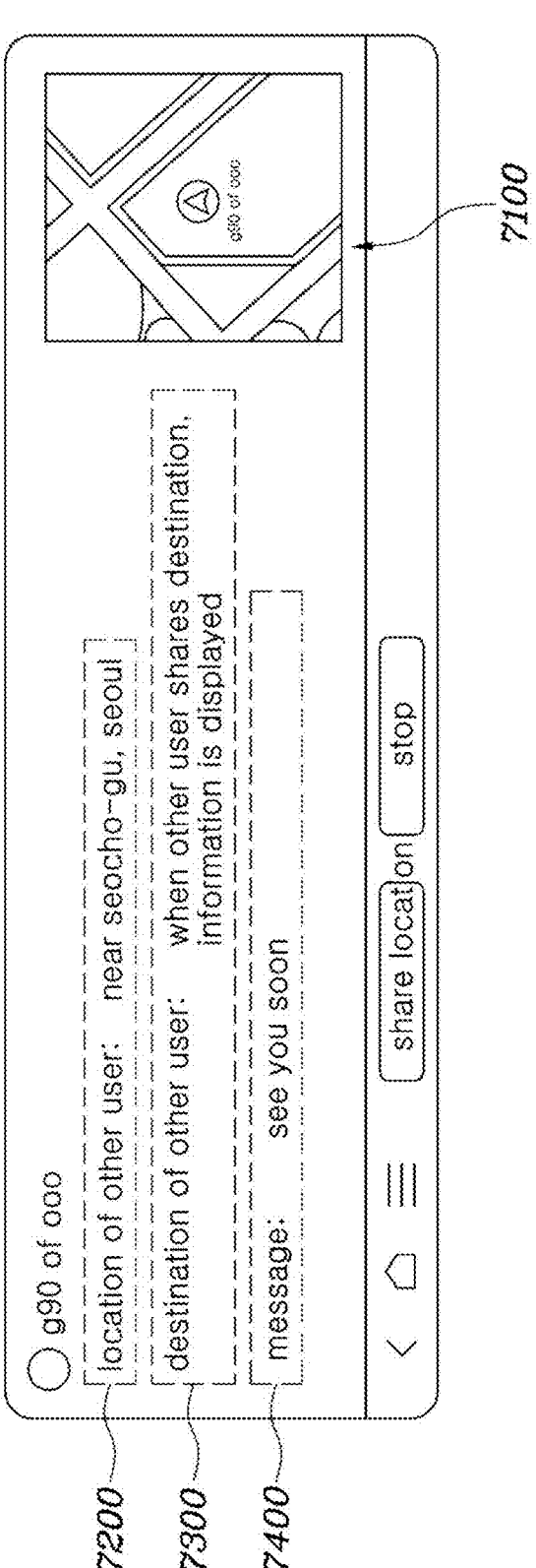
FIG. 7 is a diagram illustrating an example of a real-time location sharing service provided by the vehicle device of the user.

FIG. 4 is a diagram for describing a vehicle location sharing method according to an exemplary embodiment of the present disclosure, FIG. 5 is a diagram illustrating an example of a sharing proposal message provided by the server, FIG. 6 is a diagram illustrating an example of a sharing selection message displayed by the vehicle device of the user, and FIG. 7 is a diagram illustrating an example of a real-time location sharing service provided by the vehicle device of the user.

The vehicle device 200 of the other user may transmit a sharing request message for real-time location sharing with the vehicle device 500 of the user and the mobile phone number of the user to the server 300 (4100). This method is convenient since location sharing between vehicles may be started even when the other user does not know the terminal number of the vehicle.

The server 300 may transmit a sharing proposal message proposing real-time location sharing of the vehicle device 500 of the user and the vehicle device 200 of the other user to the mobile device 400 of the user (4200).

The vehicle device 500 of the user may extract a text message and the mobile phone number of the user from the mobile device 400 of the user (4300).

The vehicle device 500 of the user may parse the text message and extract a sharing proposal message including text corresponding to the preset identification text from the text message (4400).

FIG. 5 is an example of a sharing proposal message 5100 and illustrates an example of a specific URI 5200.

The vehicle device 500 of the user may recognize the specific URI 5200 including text corresponding to identification text (http://m.ge) and extract a sharing proposal message from a text message.

The vehicle device 500 of the user may transmit the specific URI and the mobile phone number of the user parsed from the sharing proposal message to the server 300 (4500).

The server 300 may transmit shared data for real-time location sharing with the vehicle device 200 of the other user to the vehicle device 500 of the user in response to specific text (for example, specific URI) and the mobile phone number of the user (4600).

The vehicle device 500 of the user may display a sharing selection message for selecting whether to share a real-time location with the vehicle of the other user in response to the shared data (4700).

FIG. 6 is an example of a sharing selection message 6100 displayed on the vehicle device 500, and the sharing selection message 6100 may include a first selection button 6110 allowing the vehicle device 500 of the user and the vehicle device 200 of the other user to mutually accept real-time location sharing, a second selection button 6120 allowing acceptance of only real-time location sharing of the vehicle device 200 of the other user, and a third selection button 6130 for rejecting real-time location sharing with the vehicle device 200 of the other user.

According to user input, the vehicle device 500 of the user may provide a service in which the vehicle device 500 of the user mutually shares real-time locations with the vehicle device 200 of the other user, provide only a real-time location sharing service of the vehicle device 200 of the other user, or not provide the real-time location sharing service with respect to the vehicle device 200 of the other user (4800). For example, when the third selection button 6130 for rejecting real-time location sharing is selected, location sharing through the vehicle device 500 may not proceed, and location sharing may be maintained only with the mobile device 400 of the user with which the location has been shared in the first place.

FIG. 7 is an example of a real-time location sharing service provided by the vehicle device 500 of the user, and may include a location 7100 and 7200 of the vehicle 1 of the other user, memo text 7400 input by the other user, and a destination 7300 of the other user.

The vehicle device 500 of the user may transmit user input to the server (4910).

When the server 300 receives user input that mutually accepts real-time location sharing of the vehicle device 500 of the user and the vehicle device 200 of the other user, the server 300 may transmit shared data for location sharing with the vehicle device 500 of the user to the vehicle device 200 of the other user (4920).

The vehicle device 200 of the other user may provide a service for sharing real-time location with the vehicle device 2 of the user (4930).

The present disclosure may provide convenience for a vehicle location sharing service to users by providing a service allowing real-time locations to be shared between vehicles through a mobile phone number of another user even when a terminal number of another vehicle is not known, and may further activate the vehicle location sharing service.

Furthermore, a URI allowing a location of a vehicle proposing sharing to be checked in real time is included in a text message proposing vehicle location sharing, and the URI is parsed to identify the text message as a sharing proposal message, so that a real-time location of another vehicle may be easily detected using only mobile devices of users. At the same time, a general text message and a sharing request message received by a mobile device may be easily distinguished from each other, and other text for identification of the sharing request message is not added, so that a location sharing service between vehicles may be efficiently provided.

In various exemplary embodiments of the present disclosure, the scope of the present disclosure includes software or machine-executable commands (e.g., an operating system, an application, firmware, a program, etc.) for enabling operations according to the methods of various embodiments to be executed on an apparatus or a computer, a non-transitory computer-readable medium including such software or commands stored thereon and executable on the apparatus or the computer.

In various exemplary embodiments of the present disclosure, the control device may be implemented in a form of hardware or software, or may be implemented in a combination of hardware and software.

Furthermore, the terms such as "unit", "module", etc. included in the specification mean units for processing at least one function or operation, which may be implemented by hardware, software, or a combination thereof.

In an exemplary embodiment of the present disclosure, the vehicle may be referred to as being based on a concept including various means of transportation. In some cases, the vehicle may be interpreted as being based on a concept including not only various means of land transportation, such as cars, motorcycles, trucks, and buses, that drive on roads but also various means of transportation such as airplanes, drones, ships, etc.

For convenience in explanation and accurate definition in the appended claims, the terms "upper", "lower", "inner", "outer", "up", "down", "upwards", "downwards", "front", "rear", "back", "inside", "outside", "inwardly", "outwardly", "interior", "exterior", "internal", "external", "forwards", and "backwards" are used to describe features of the exemplary embodiments with reference to the positions of such features as displayed in the figures. It will be further understood that the term "connect" or its derivatives refer both to direct and indirect connection.

The term "and/or" may include a combination of a plurality of related listed items or any of a plurality of related listed items. For example, "A and/or B" includes all three cases such as "A", "B", and "A and B".

In the present specification, unless stated otherwise, a singular expression includes a plural expression unless the context clearly indicates otherwise.

In exemplary embodiments of the present disclosure, "at least one of A and B" may refer to "at least one of A or B" or "at least one of combinations of at least one of A and B". Furthermore, "one or more of A and B" may refer to "one or more of A or B" or "one or more of combinations of one or more of A and B".

In the exemplary embodiment of the present disclosure, it should be understood that a term such as "include" or "have" is directed to designate that the features, numbers, steps, operations, elements, parts, or combinations thereof described in the specification are present, and does not preclude the possibility of addition or presence of one or more other features, numbers, steps, operations, elements, parts, or combinations thereof.

According to an exemplary embodiment of the present disclosure, components may be combined with each other to be implemented as one, or some components may be omitted.

The foregoing descriptions of specific exemplary embodiments of the present disclosure have been presented for purposes of illustration and description. They are not intended to be exhaustive or to limit the present disclosure to the precise forms disclosed, and obviously many modifications and variations are possible in light of the above teachings. The exemplary embodiments were chosen and described in order to explain certain principles of the invention and their practical application, to enable others skilled in the art to make and utilize various exemplary embodiments of the present disclosure, as well as various alternatives and modifications thereof. It is intended that the scope of the present disclosure be defined by the Claims appended hereto and their equivalents.

What is claimed is:

1. A method of sharing a vehicle location through mobile text message parsing, the method comprising:
respectively extracting, by a processor, a text message and a mobile phone number of a user from a mobile device of the user;
receiving, by the processor, shared data for real-time location sharing with a vehicle of another user from a server based on a parsing result for the text message and the mobile phone number of the user; and
displaying, by a vehicle display, a real-time location of the vehicle of the other user based on the shared data.

2. The method of claim 1, wherein the receiving includes:
extracting a sharing proposal message including text corresponding to preset identification text in the text message by parsing the text message;
transmitting, to the server, a predetermined uniform resource identifier (URI) parsed from the sharing proposal message and the mobile phone number of the user; and
receiving, from the server, the shared data for a vehicle of the other user corresponding to the predetermined URI and the mobile phone number of the user.

3. The method of claim 2, wherein the providing includes:
displaying a sharing selection message for selecting whether to share a real-time location with the vehicle of the other user in response to the shared data;
receiving input by the user for the displayed sharing selection message; and
providing a service in which a vehicle of the user mutually shares real-time locations with the vehicle of the other user, exclusively providing a real-time location sharing service of the vehicle of the other user, or not providing the real-time location sharing service with respect to the vehicle of the other user according to the input by the user.

4. The method of claim 3, wherein the sharing selection message includes at least a first selection button allowing the vehicle of the user and the vehicle of the other user to mutually accept real-time location sharing, a second selection button exclusively allowing acceptance of real-time location sharing of the vehicle of the other user, or a third selection button for rejecting the real-time location sharing with the vehicle of the other user.

5. The method of claim 3,
wherein the preset identification text is set to a part of text included in the predetermined URI, and
wherein the predetermined URI links to a Webpage that provides a real-time location of the vehicle of the other user.

6. An apparatus for sharing a vehicle location through mobile text message parsing, the apparatus comprising:
a memory configured to store instructions for vehicle location sharing; and
a processor operatively connected to the memory and configured to execute the instructions, wherein, in response that the instructions are executed by the processor, the processor is configured to:
respectively extract a text message and a mobile phone number of a user from a mobile device of the user,
receive shared data for real-time location sharing with a vehicle of another user from a server based on a parsing result for the text message and the mobile phone number of the user, and
display a real-time location of the vehicle of the other user based on the shared data.

7. The apparatus of claim 6, wherein the processor is further configured to:
extract a sharing proposal message including text corresponding to preset identification text in the text message by parsing the text message,
transmit, to the server, a predetermined URI parsed from the sharing proposal message and the mobile phone number of the user, and
receive, from the server, the shared data for the vehicle of the other user corresponding to the predetermined URI and the mobile phone number of the user.

8. The apparatus of claim 7, wherein the processor is further configured to:

display a sharing selection message for selecting whether to share a real-time location with the vehicle of the other user in response to the shared data, receive input by the user for the displayed sharing selection message, and provide a service in which a vehicle of the user mutually shares real-time locations with the vehicle of the other user, exclusively provide a real-time location sharing service of the vehicle of the other user, or not provide the real-time location sharing service with respect to the vehicle of the other user according to the input by the user.

9. The apparatus of claim 7, wherein the sharing selection message includes at least a first selection button allowing a vehicle of the user and a vehicle of the other user to mutually accept the real-time location sharing, a second selection button exclusively allowing acceptance of the real-time location sharing of the vehicle of the other user, or a third selection button for rejecting the real-time location sharing with the vehicle of the other user.

10. The apparatus of claim 8, wherein the preset identification text is set to a part of text included in the predetermined URI, and wherein the predetermined URI links to a Webpage that provides a real-time location of the vehicle of the other user.

11. A method of sharing a vehicle location through mobile text message transmission, the method comprising:

receiving, from a first vehicle of a first user, a sharing request message for real-time location sharing with a second vehicle of a second user and a mobile phone number of the second user;

transmitting, to a mobile device of the second user, a sharing proposal message for proposing real-time location sharing with the first vehicle generated using the sharing request message and the mobile phone number of the second user; and transmitting first shared data for real-time location sharing with the first vehicle to the second vehicle in response to predetermined text and the mobile phone number of the second user included in the sharing proposal message received from the second vehicle, wherein the second vehicle obtains the sharing proposal message and the mobile phone number of the second user from the mobile device of the second user, and wherein the sharing proposal message and the mobile phone number are extracted, respectively, by a processor of the second vehicle.

12. The method of claim 11, further including:

receiving input by the second user input for a sharing selection message for selecting whether to share a real-time location with the first vehicle displayed in response to the first shared data in the second vehicle; and transmitting second shared data for real-time location sharing with the second vehicle to the first vehicle according to input by the second user.

13. The method of claim 12, wherein the sharing selection message includes at least a first selection button allowing the second vehicle to mutually accept the real-time location sharing with the first vehicle, a second selection button allowing the second vehicle to exclusively receive the real-time location sharing of the first vehicle, or a third selection button allowing the second vehicle to reject the real-time location sharing with the first vehicle, and wherein the transmitting second shared data includes transmitting the second shared data upon receiving the input by the second user for the first selection button.

14. The method of claim 11, wherein the sharing request message includes at least one of location information of the first vehicle, memo text for the second user input by the first user, and a destination of the first user, and wherein the sharing proposal message includes at least a predetermined URI that links to a Webpage providing a real-time location of the first vehicle, the memo text, or the destination of the first user.

15. The method of claim 14, wherein the predetermined text is the predetermined URI extracted by parsing the sharing proposal message from the second vehicle.

* * * * *